United States Patent
Izutsu et al.

(12) 
(10) Patent No.: US 6,202,990 B1
(45) Date of Patent: Mar. 20, 2001

(54) SPRAY TOWER FOR COOLING, MOISTENING AND/OR PURIFYING GAS

(75) Inventors: Masahiro Izutsu; Kenji Fujita; Masashi Ohbuchi, all of Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 08/291,486

(22) Filed: Aug. 17, 1994

(30) Foreign Application Priority Data

Aug. 31, 1993 (JP) .................................... 5-237288

(51) Int. Cl.[7] .................................... B01F 3/04
(52) U.S. Cl. .................. 261/116; 261/DIG. 11; 96/257; 96/366
(58) Field of Search .................. 261/30, 64.1, 76, 261/115, 116, DIG. 11; 96/257, 366, 367, 368, 369, 370, 371, FOR 116, FOR 156

(56) References Cited

U.S. PATENT DOCUMENTS

| | | |
|---|---|---|
| 3,396,207 | 8/1968 | Bartholome et al. . |
| 3,461,682 | 8/1969 | Darby . |
| 4,293,521 | 10/1981 | Isahaya et al. . |
| 4,693,852 * | 9/1987 | Gordon .................. 261/30 |
| 4,882,020 | 11/1989 | Maezawa et al. . |
| 4,915,712 * | 4/1990 | Felsted .................. 261/116 |

FOREIGN PATENT DOCUMENTS

| | | | |
|---|---|---|---|
| 2244140 * | 3/1973 | (DE) | ..................... 261/116 |
| 1 222 940 | 2/1971 | (GB) . | |
| 57-169512 | 10/1982 | (JP) . | |
| 59-108057 | 7/1984 | (JP) . | |
| 755985 * | 8/1980 | (SU) | ..................... 261/30 |

OTHER PUBLICATIONS

"Development of Simplified Semi–Dry Type Desulfurization System", No. 109, 1991, Kazuto Marui, et al., pp. 39–46 (with partial English translation).

* cited by examiner

Primary Examiner—C. Scott Bushey
(74) Attorney, Agent, or Firm—Oblon, Spivak, McClelland, Maier & Neustadt, P.C.

(57) ABSTRACT

A dry spray tower unattended by generation of waste water has a top provided with a gas inlet port, an expanded portion extending downwardly from the top which gradually enlarges, and spray nozzles attached to the expanded portion or a portion immediately downstream from the expanded portion to spray water and/or an absorbing solution, thereby cooling and moistening a gas and/or removing a harmful component from the gas. A gas distributing device is disposed in or around the expanded portion at a position upstream from the spray nozzles for making the downward component of flow velocity of the gas faster at the peripheral portion of the spray tower than at the central portion thereof, whereby sprayed liquid droplets are prevented from colliding with the inner wall of the tower.

7 Claims, 3 Drawing Sheets

PRIOR ART

SPRAY TOWER FOR COOLING, MOISTENING AND/OR PURIFYING GAS

BACKGROUND OF THE INVENTION

1. Field of the Art

The present invention relates to a spray tower or cooling, moistening and/or purifying a gas. More particularly, the present invention relates to a dry spray tower and method whereby water and/or an absorbing solution is sprayed by a spray nozzle attached in the vicinity of the top of the spray tower, thereby cooling and moistening a gas and/or removing a harmful component from the gas without producing waste water.

2. Prior Art

To cool and moisten a gas and/or remove a harmful component from the gas, a dry spray tower has heretofore been used. FIG. 5, for example, shows a typical conventional dry spray tower in which the gas 5a is introduced into the tower from the top 1 thereof through an expanded portion 2 and sprayed with water and/or an absorbing solution by a spray nozzle 4 attached in the vicinity of the top of the tower, and in which the sprayed water and/or absorbing solution is completely evaporated in the tower so that no waste water is produced. In such a spray tower, a swirling motion is often given to the gas when introduced into the tower.

The conventional technique suffers, however, from the problem that liquid droplets sprayed in the vicinity of the top of the spray tower collide with the inner wall of the tower and the liquid flows down as far as the bottom, resulting in waste water.

That is, in the conventional spray tower, as shown in FIG. 5, the flow velocity of gas is relatively fast in the central portion of the tower at a position immediately downstream from an expanded portion 2 through which the exhaust gas is introduced into the tower, whereas it is relatively slow in the peripheral portion of the tower. Therefore, at the downstream side of the expanded portion 2, the gas whirls up from the central portion toward the peripheral portion of the tower as shown by an arrow 5b. As a result, sprayed liquid droplets collide with the inner wall of the tower, giving rise to problems as described above. In particular, when the temperature of the exhaust gas, after the sprayed water and/or absorbing solution has evaporated, is lower than the dew point of the gas plus 50° C., it is difficult for liquid droplets having collided with the inner wall to re-evaporate. Therefore, there is a very strong possibility that the liquid droplets colliding with the inner wall will flow down as far as the bottom to become waste water. Further, when the gas contains dust, the dust adheres to the inner wall wetted with the liquid droplets.

Further, in a case where a swirling motion is given to the gas when introduced into the spray tower, the centrifugal force induced by the swirl of the gas tends to encourage the collision of sprayed liquid droplets with the inner wall of the tower, which enhances the problem.

Therefore the object of the present invention is to solve the above-described problems of the conventional technique and to provide a spray tower and method for cooling, moistening and/or purifying a gas, wherein sprayed liquid droplets are prevented from colliding with the inner wall of the tower, thereby preventing generation of waste water and adhesion of dust to the inner wall of the tower.

SUMMARY OF THE INVENTION

To solve the above-described problems, as shown in FIG. 1, the present invention provides a dry spray tower without producing waste water, having a top 1 provided with a gas inlet port, an expanded portion 2 extending downwardly from the top while radially gradually enlarging, and a spray nozzle 4 attached to the expanded portion or a portion immediately downstream from the expanded portion to spray water and/or an absorbing solution, thereby cooling and moistening a gas and/or removing a harmful component from the gas, wherein a gas distributing device 6 is disposed in or around the expanded portion at a position upstream from the spray nozzle for making the downward component of flow velocity of the gas faster at the peripheral portion of the spray tower than at the central portion thereof.

An effective example of the above-described gas distributing device may be a perforated plate having a higher opening ratio at the peripheral portion than at the central portion thereof, a perforated plate provided in such a manner that an annular slit or gap is formed between the peripheral portion of the perforated plate and the inner wall of the expanded portion or a straight wall portion of the tower, a combination of a perforated plate crossing the inside of the tower and a distributing grille provided above or below the perforated plate, a combination of a pair of parallel perforated plates disposed in such a manner that an annular slit or gap is formed between the peripheral portion of each plate and the inner wall of the expanded portion or a straight wall portion and a distributing grille sandwiched between said pair of perforated plates, or a device composed of a multiple skirt-shaped guide plate for aiding the spread of exhaust gas and a perforated plate having a diameter smaller than that of the tower and disposed at the bottom of the central portion of the guide plate.

In addition, the present invention provides for a method for cooling, moistening and/or purifying a gas without producing waste water, in which a gas introduced into a spray tower from the top through an expanded portion is sprayed with water and/or an absorbing solution by a spray nozzle attached to the expanded portion or a portion immediately downstream from the expanded portion, thereby cooling and moistening the gas and/or removing a harmful component from the gas, and in which the temperature of exhaust gas after the sprayed water and/or absorbing solution has evaporated is lower than the dew point of the gas plus 50° C., wherein the introduced gas is distributed at a position upstream of the spray nozzle so that the downward component of flow velocity of the gas is faster at the peripheral portion of the spray tower than at the central portion thereof.

In a conventional spray tower, as stated above, the flow velocity of gas is relatively fast in the central portion of the tower at a position immediately downstream from the expanded portion through which the exhaust gas is introduced into the tower. Therefore, at the downstream side of the expanded portion, the gas whirls up from the central portion toward the peripheral portion of the tower and sprayed liquid droplets collide with the inner wall of the tower, giving rise to problems as described above.

On the other hand, in a spray tower and a method for cooling, moistening and/or purifying a gas according to the present invention, as shown in FIG. 1, the flow velocity of gas is faster at the peripheral portion than at the central portion of the tower, and the gas whirls up from the peripheral portion toward the central portion in a reverse manner to that of the prior art. As a result, sprayed liquid droplets are prevented from colliding with the inner wall of the tower. Accordingly, there is no possibility that liquid droplets will collide with the inner wall to become waste water or that dust in the gas will adhere to the wall surface wetted with liquid droplets.

In the spray tower of the invention, there is no possibility that liquid droplets will flow down on the inner wall of the tower to produce waste water even under operating conditions where the temperature of the exhaust gas after the sprayed water and/or absorbing solution has evaporated is lower than the dew point of the gas plus 50° C.

The above and other objects, features and advantages of the present invention will become more apparent from the following description when taken in conjunction with the accompanying drawings in which preferred embodiments of the present invention are shown by way of illustrative examples.

PREFERRED EMBODIMENTS OF THE INVENTION

The present invention will be more specifically described below by way of examples. However, the present invention is in no way restricted by these examples.

Embodiment 1

Figure 5:
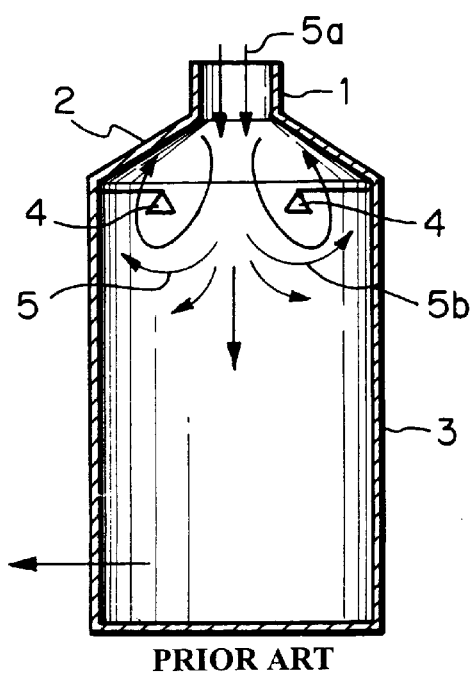
FIG. 5 illustrates the flow of a gas in a conventional spray tower.

First, a spray tower similar to that shown in FIG. 5 is prepared.

A duct 1 having a diameter of 0.3 m was connected to a tower having a diameter of 1.2 m and a height (i.e., the height of the straight shell portion) of 10 m, and a coal combustion gas 5a having a temperature of 150° C. and a moisture content of 7.8 vol % (wet base) was introduced at 1,500 m³N per hour. Water was sprayed under 5 different conditions from spray nozzles 4 attached in the vicinity of the top of the tower. In this way, the conditions of the generation of waste water from the bottom of the gas cooling tower were examined.

The results are shown in Table 1.

TABLE 1

| | | Rate of water spray | Exhaust gas temperature at tower outlet | Difference between gas temperature and dew point | Generation of waste water |
|---|---|---|---|---|---|
| Case | 1 | 40 kg/h | 100° C. | 52° C. | Bottom slightly wetted |
| | 2 | 49 kg/h | 90° C. | 41° C. | 0.8 kg/h |
| | 3 | 58 kg/h | 80° C. | 30° C. | 0.9 kg/h |
| | 4 | 67 kg/h | 70° C. | 19° C. | 1.0 kg/h |
| | 5 | 75 kg/h | 60° C. | 8° C. | 1.2 kg/h |

In all of the above cases, sprayed water droplets collided with the inner wall of the tower. In only case 1, did most of the collided water droplets re-evaporate while flowing down on the inner wall. In the other cases, the water droplets flowed down as far as the bottom, resulting in waste water.

Figure 1:
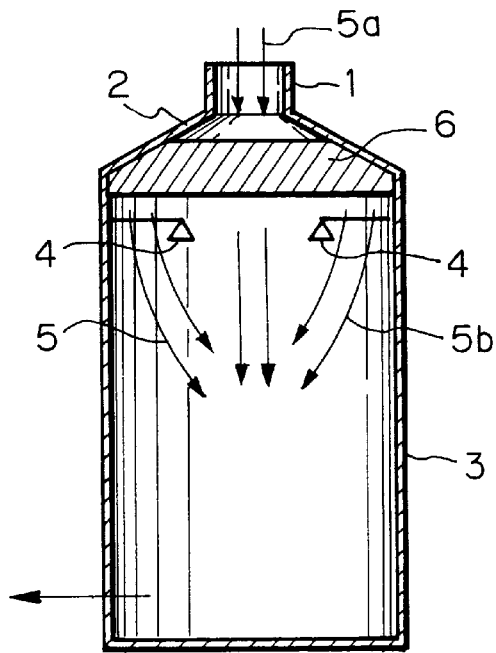
FIG. 1 illustrates a disposition of a gas distributing device and flow of a gas in the spray tower of the present invention.
Figure 2A:
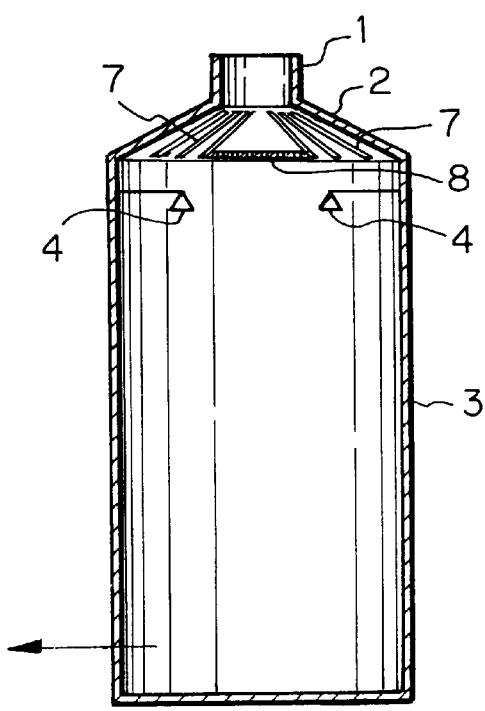
FIG. 2(a) is a schematic sectional view showing one embodiment of the spray tower according to the present invention.
Figure 2B:
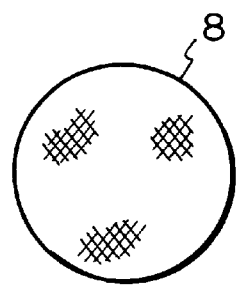
FIG. 2(b) is a plane view showing a perforated plate used in the gas distributing device shown in FIG. 2(a)

Next, a gas distributing device such as that shown in FIGS. 2(a) and 2(b) was installed in the top of the tower. That is, the gas distributing device was composed of a multiple skirt-shaped guide plate 7 and a perforated plate 8 having a smaller diameter than that of the tower, which is attached to the bottom of the central portion of the guide plate 7. As a result, in all the cases 1 to 5, sprayed liquid droplets were prevented from colliding with the inner wall of the tower, and no waste water was generated from the bottom.

Embodiment 2

First, a spray tower similar to that shown in FIG. 5 was prepared.

A duct 1 having a diameter of 1 m was connected to a tower having a diameter of 5.5 m and a height (i.e., the height of the straight shell portion) of 16 m, and a gas 5a of 300° C. containing dust at 10 g/m³N was introduced at 30,000 m³N per hour. Water was sprayed at about 2,400 kg per hour from spray nozzles 4 attached in the vicinity of the top of the tower so that the gas was cooled down to 150° C. Under these conditions, the gas cooling tower was operated. As a result, dust adhered to the inner wall in the vicinity of the spray nozzles, causing the pressure loss to increase, and the tower became unable to operate in one month.

Figure 3A:
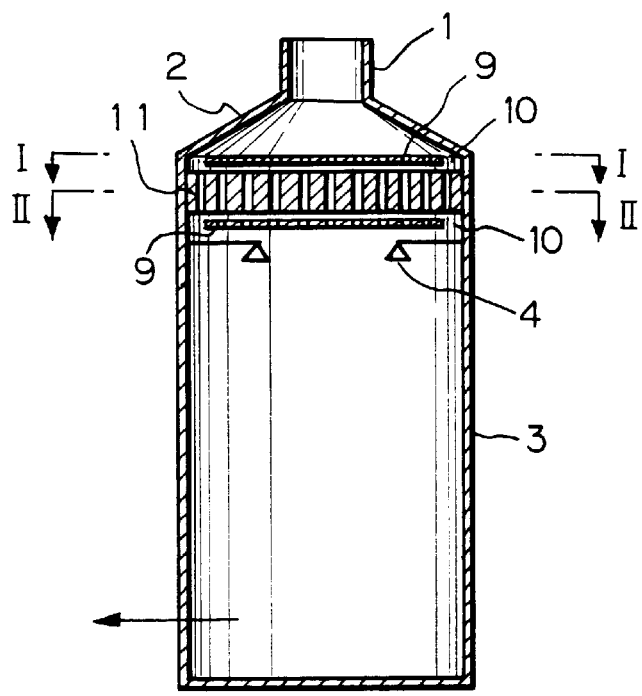
FIG. 3(a) is a schematic sectional view showing another embodiment of the spray tower according to the invention.
Figure 3B:
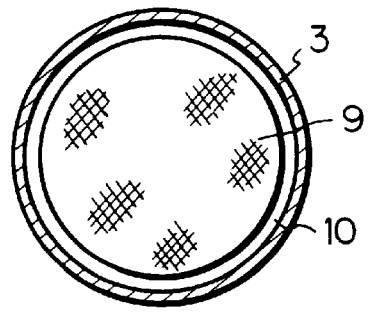
FIG. 3(b) is a plane view taken along line I—I in FIG. 3(a)
Figure 3C:
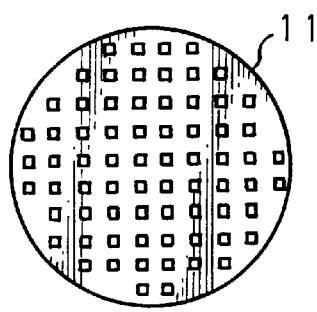
FIG. 3(c) is a plane view taken along line II—II in FIG. 3(a)

Next, a gas distributing device such as that shown in FIGS. 3(a), 3(b), and 3(c) was installed in the top of the tower. That is, the gas distributing device was composed of a distributing grille or flow regulating means 11 and a pair of perforated plates 9, which are disposed to sandwich the distributing grille 11 therebetween. Each of the perforated plates 9 is so disposed that an annular slit or gap 10 is formed between the outer periphery of the plate and the inner wall of the tower 3. As a result adhesion of dust to the inner wall of the tower was prevented, and there was no increase in the pressure loss.

Embodiment 3

Figure 4:
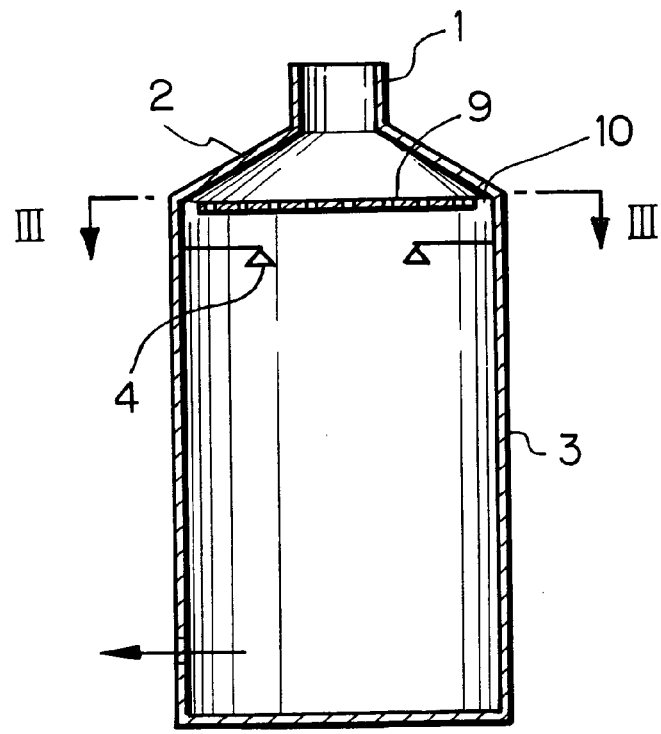
FIG. 4(a) is a schematic sectional view showing a further embodiment of the spray tower according to the present invention.
FIG. 4(b) is a sectional view taken along line III—III in FIG. 4(a)
Figure 4:
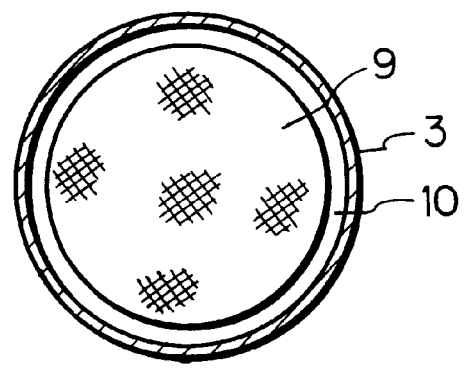

FIGS. 4(a) and 4(b) show a further example of the spray tower according to the present invention.

In this example, as a gas distributing device, a perforated plate 9 is disposed within the tower above the spray nozzle 4 so that an annular slit or gap 10 is formed between the outer periphery of the plate 9 and an inner wall of the tower 3.

In this embodiment also, similar advantageous effects stated above referring to the first and second embodiment can be obtained.

Incidentally, the shape and construction of the gas distributing device adopted in the spray tower of this invention are not limited to those explained above. For example, an annular slit or gap is not necessary to have a uniform width. Also, a perforated plate need not necessarily serve as a flat plate. Further, in the examples shown in FIGS. 3(a)–3(c) and 4(a)–4(b), an annular slit or gap 10 may be omitted if the perforated plate 9 has a higher opening ratio at a peripheral portion thereof than at the central portion thereof. In addition, in the example shown in FIGS. 3(a)–3(c), an upper or lower perforated plate 9 may be omitted and the gas distributing device could be constituted by a combination of a perforated plate 9 crossing the inside of the tower and a distributing grille 11 provided above or below the perforated plate. In brief, it is sufficient to make a downward component of flow velocity of the gas faster at a peripheral portion of the spray tower than at a central portion thereof.

As explained above, according to the present invention, liquid droplets sprayed in the vicinity of the top of a spray tower for cooling, moistening and/or purifying a gas were prevented from colliding with the inner wall of the tower, thereby preventing generation of waste water from the bottom of the tower and adhesion of dust to the inner wall in the vicinity of the spray section.

What is claimed is:

1. A dry spray tower for cooling, moistening and purifying a gas having a top provided with a gas inlet port, an expanded portion extending downwardly from said top while radially gradually enlarging, and a spray nozzle attached to said expanded portion or a portion immediately downstream from said expanded portion to spray water or an absorbing solution, thereby cooling and moistening the gas or removing a harmful component from the gas, wherein a gas distributing device is disposed in or immediately downstream from said expanded portion at a position upstream from said spray nozzle for making a downward component of flow velocity of the gas faster at a peripheral portion of said spray tower than at a central portion thereof.

2. A spray tower according to claim 1, wherein said gas distributing device has a higher opening ratio at a peripheral portion thereof than at a central portion thereof.

3. A spray tower according to claim 2, wherein said gas distributing device is a perforated plate crossing an inside of said tower.

4. A spray tower according to claim 1 or 2, wherein said gas distributing device is a perforated plate provided in such a manner that an annular slit or gap is formed between the peripheral portion of said perforated plate and an inner wall of said expanded portion or a straight wall portion of said spray tower.

5. A spray tower according to claim 1 or 2, wherein said gas distributing device is a combination of a perforated plate crossing the inside of said tower and a distributing grille provided above or below said perforated plate.

6. A spray tower according to claim 1 or 2, wherein said gas distributing device is a combination of a pair of parallelly disposed perforated plates arranged in such a manner that an annular slit or gap is formed between the peripheral portion of each of said plate and an inner wall of said expanded portion or a straight wall portion and a distributing grille sandwiched between said pair of perforated plates.

7. A spray tower according to claim 1 or 2, wherein said gas distributing device is a device composed of a multiple skirt-shaped guide plate for aiding a spread of exhaust gas and a perforated plate having a diameter smaller than that of the tower and disposed at a bottom of a central portion of said guide plate.

* * * * *